United States Patent [19]
Bevermann

[11] Patent Number: 5,839,676
[45] Date of Patent: Nov. 24, 1998

[54] CUTTING MACHINE FOR EXTRACTION OF SILAGE FROM FLAT SILOS

[75] Inventor: Wilhelm Bevermann, Bad Laer, Germany

[73] Assignee: B. Strautmann & Söhne GmbH & Co., Bad Laer, Germany

[21] Appl. No.: 715,617

[22] Filed: Sep. 18, 1996

[30] Foreign Application Priority Data

Sep. 22, 1995 [DE] Germany .......................... 295 15 146.3
Mar. 28, 1996 [DE] Germany .......................... 196 12 363.1

[51] Int. Cl.$^6$ ...................................................... A01F 29/08
[52] U.S. Cl. ...................... 241/101.76; 241/605; 241/283
[58] Field of Search ..................... 30/123, 379.5, 30/165; 414/546, 685; 83/610, 647, 748, 768, 769, 928, 956; 241/101.76, 283, 605; 403/291

[56] References Cited

U.S. PATENT DOCUMENTS

| | | |
|---|---|---|
| 3,741,051 | 6/1973 | Brooks et al. ...................... 241/101.76 |
| 3,830,438 | 8/1974 | Garrison et al. .................... 241/101.76 |
| 4,141,143 | 2/1979 | Hirschkoff et al. ....................... 30/381 |
| 5,333,799 | 8/1994 | Posthumus .............................. 241/605 |
| 5,340,042 | 8/1994 | Bergkamp et al. ..................... 241/605 |
| 5,542,326 | 8/1996 | Borgford ................................. 241/605 |
| 5,544,822 | 8/1996 | Neier ...................................... 241/605 |
| 5,573,190 | 11/1996 | Goossen ................................. 241/605 |

*Primary Examiner*—Hwei-Siu Payer
*Attorney, Agent, or Firm*—Henry M. Feiereisen

[57] ABSTRACT

A cutting machine for extraction of silage from flat silos includes a frame which has an underside of straight, L-shaped or U-shaped configuration for supporting a cutter assembly, and is swingably guided upwardly and downwardly by rockers or vertical guides. At least one vibrator is secured to the frame for oscillatingly driving the cutting machine.

21 Claims, 8 Drawing Sheets

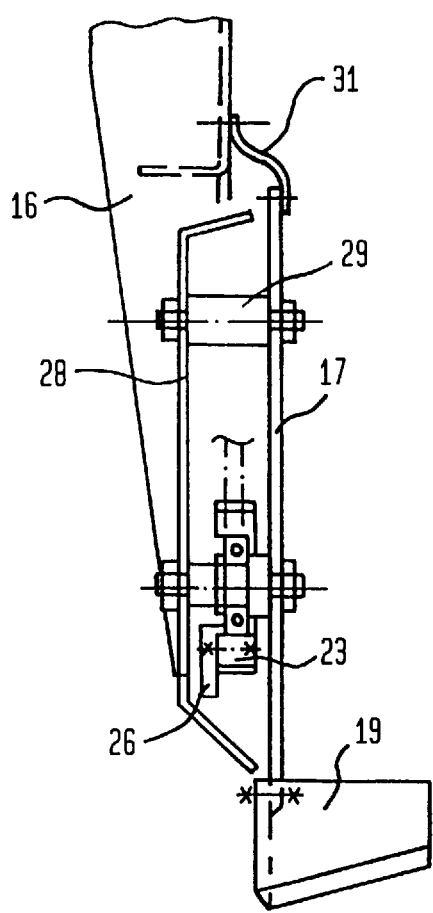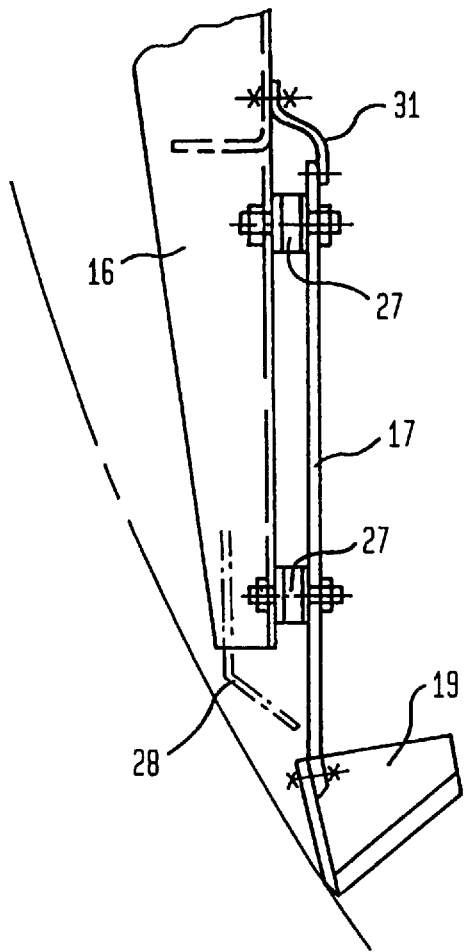

CUTTING MACHINE FOR EXTRACTION OF SILAGE FROM FLAT SILOS

BACKGROUND OF THE INVENTION

The present invention refers to a cutting machine for extraction of silage from flat silos, and in particular to a silage cutting machine of a type having a holding frame which exhibits an underside of straight, L-shaped or U-shaped configuration for supporting a cutter assembly, and being moveably guided upwardly and downwardly by rockers or vertical guides.

Silage cutting machines of this type are known in a wide variety of designs to cut blocks of silage from flat silos. Typically, the silage cutting machines are secured as attachment to self-propelled, drawn or tractor-mounted implements or other vehicles for extraction of fodder, fodder distribution and fodder mixture. In general, these cutting machines not only separate silage fodder but also push separated fodder into a cargo space of the respective implements or vehicles.

A simple design of a cutting machine is known under the designation "silo comb" which is equipped with comb-like prongs on the underside of the frame over the entire shield width for scraping off fodder from the flat silo and pushing it into the associated cargo space. Such cutting machines, however, operate unclean and cause a roughening of the flat silo surface. Moreover, the introduction of the fodder into the cargo space is unclean in the lower area of the prongs. Thus, afterfermentation and fodder losses are significant.

Cutting machines with horizontally oscillating blades at the bottom edges have been widely used, whereby typically, the bottom edges are of U-shaped configuration, laterally angled toward the cargo space and also equipped with blades. These cutting machines which became known as cutter blade shields produce at the flat silo smooth cutting surfaces which substantially inhibit afterfermentation and introduce the fodder into the cargo space at reduced losses. However, a drawback of such a conventional cutting machine is the number of movable driving parts that are subject to high stress so as to necessitate a continuous, thorough maintenance in order to reduce wear and susceptibility to repair. Moreover, the driving components and the guides for the blades result in an expensive blade shield.

SUMMARY OF THE INVENTION

It is an object of the present invention to provide an improved cutting machine for extraction of silage from flat silos, obviating the afore-stated drawbacks.

In particular, it is an object of the present invention to provide an improved cutting machine for extraction of silage from flat silos, which generates a clean cut at the flat silo while yet exhibiting a simple configuration so that overall production and maintenance are considerably reduced.

These objects and others which will become apparent hereinafter are attained in accordance with the present invention by providing at least one vibrator for swingably and oscillatingly operating the silage cutting machine.

Through the provision of a vibrator, the cutting machine effects a clean, afterfermentation-inhibiting cut in the flat silo while being highly cost-efficient as the type of vibrator can be designed in a simple manner. Thus, maintenance is required only at rare occasions.

Advantageously, the cutter assembly includes a transverse front blade and lateral blades, with the vibrator generating oscillations in direction of the front blade.

According to one embodiment of the present invention, the vibrator is comprised of a drive wheel and at least one unbalanced flywheel which is driven by the drive wheel and includes a weight to generate the unbalance. When utilizing a plurality of such unbalanced flywheels, these flywheels are driven via a belt by the drive wheel. The unbalanced flywheels may rotate in the same direction or in different directions through incorporation of one or more deflection pulleys. Also the unbalance-generating weights of the unbalanced flywheels may be aligned in a same direction or in different directions.

BRIEF DESCRIPTION OF THE DRAWING

The above and other objects, features and advantages of the present invention will now be described in more detail with reference to the accompanying drawing in which:

FIG. 7 is a schematic, partially sectional view of the cutting machine taken along the line VII—VII in FIG. 4;

FIG. 8 is a partial view of the lower area of the cutting machine of FIG. 5; illustrating in detail an adjusted position of the lateral blades;

DETAILED DESCRIPTION OF PREFERRED EMBODIMENTS

Figure 1:
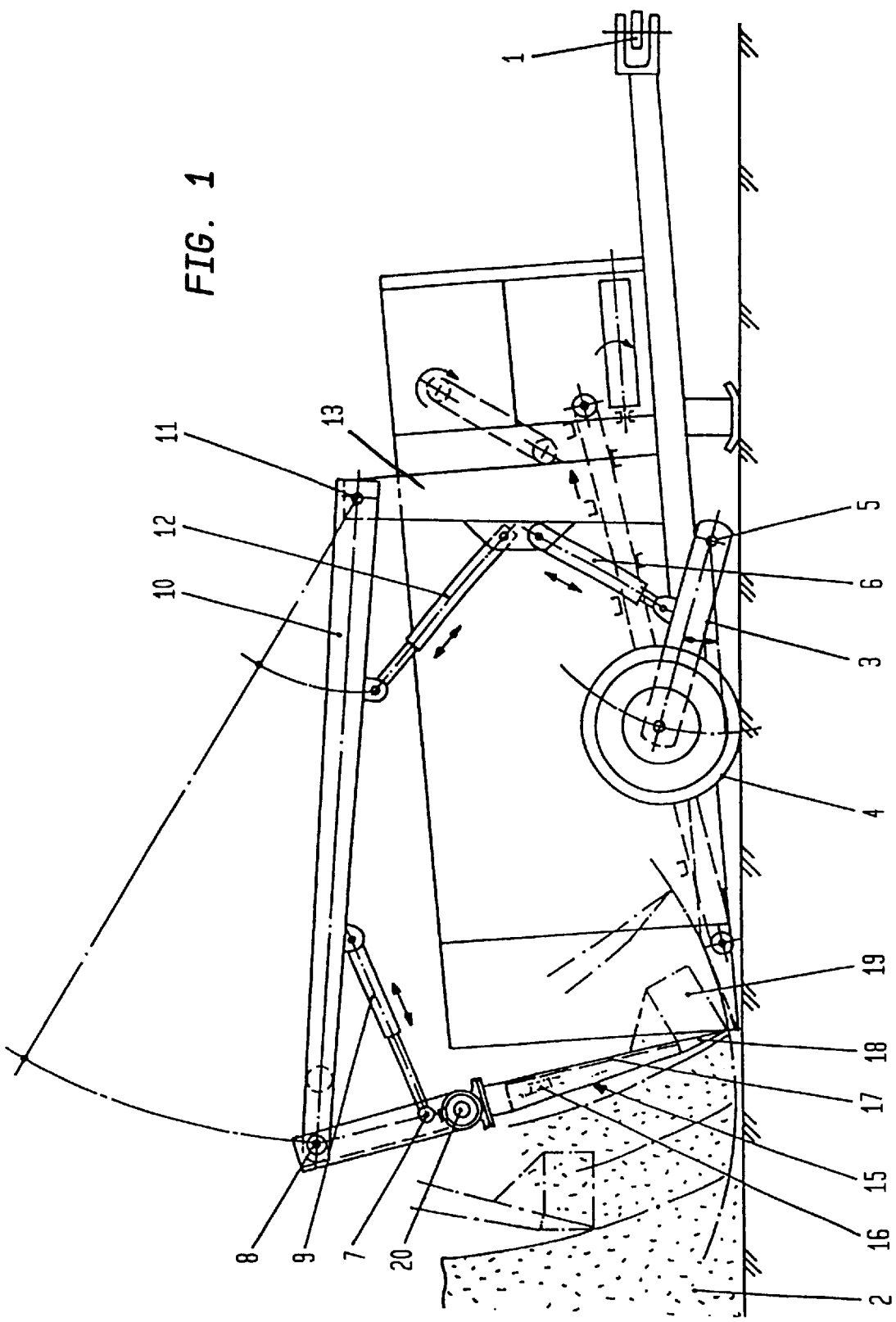
FIG. 1 is a side view of a moveable fodder distributor implement which is equipped on its rearward end with a cutting machine according to the present invention for extraction of silage from a silo.

Throughout all the Figures, the same or corresponding elements are always indicated by the same reference numerals.

Turning now to the drawing, and in particular to FIG. 1, there is shown a side view of a moveable fodder distributor implement which is preferably coupled to a not shown agricultural tractor at its linkage drawbar 1 and is equipped on the drawbar-distant end with a cutting machine according to the present invention for extraction and distribution of silage fodder. The implement is supported on wheels 4 and is swingable about a pivot axis 5 by rocker arms 3 which are supported by the wheels 4 and actuated upon by means of a hydraulic cylinder 6 which is secured to a support column 13. In order to extract silage fodder, the implement is moved backwards towards a flat silo 2 and shifted into the lower working position by swinging the implement about the pivot axis 5.

Figures 1A, 13, 14, 15:
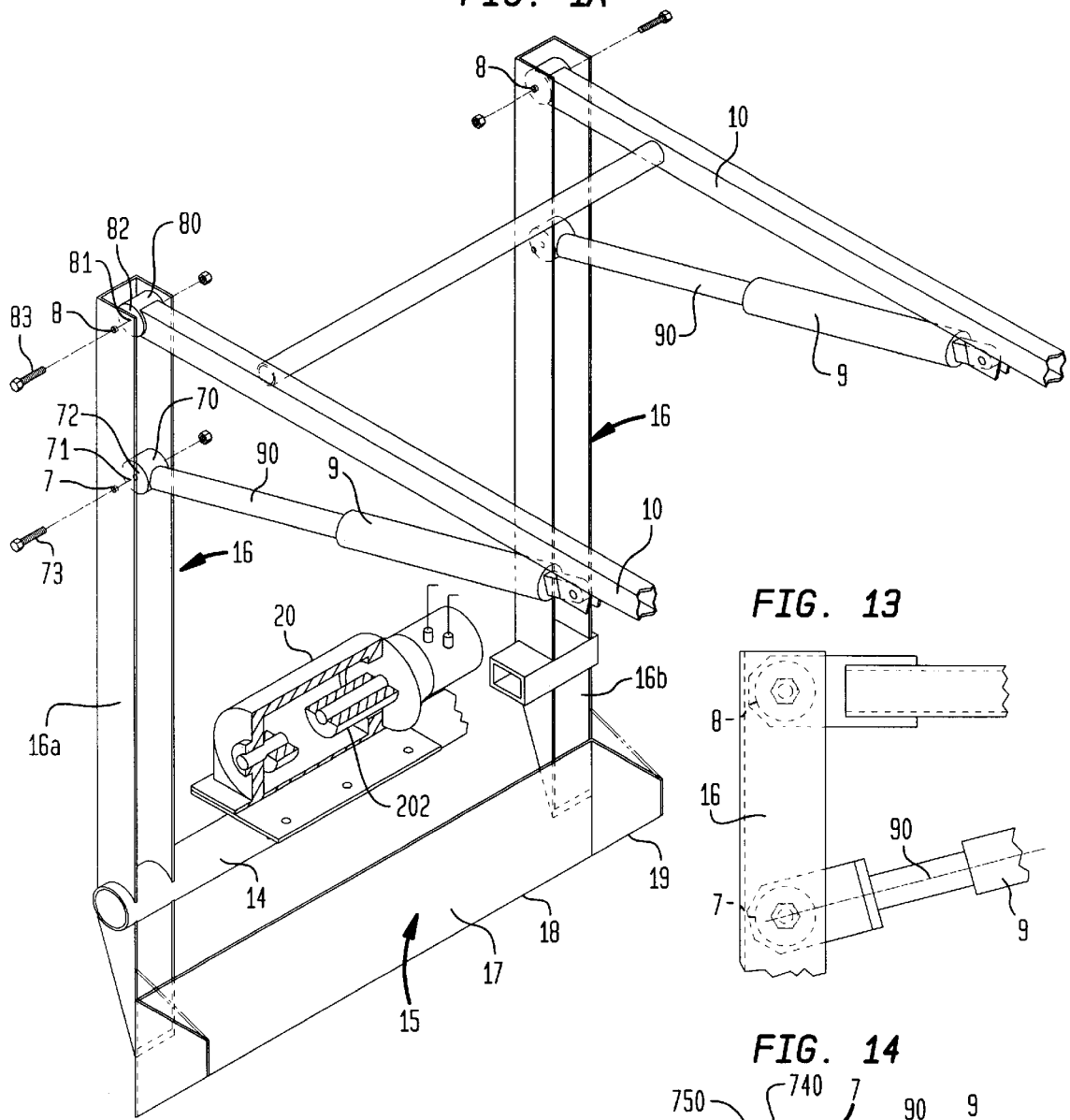
FIG. 1*a* is a schematic, perspective partial illustration of the cutting machine of FIG. 1.
FIGS. 13–15 show by way of example schematic illustrations of modified attachments between a rocker and hydraulic cylinders, on the one hand, and the holding frame, on the other hand.

Swingably secured to the upper end of the support column 13 for rotation about a pivot 11 is one end of a rocker 10 which may be of substantially U shaped configuration. Other configurations of the rocker 10 are certainly also within the scope of the invention such as e.g. a rocker of substantially T shaped configuration. Swingably mounted to the other end of the rocker 10 at attack points 8 is a silage cutting machine according to the present invention, generally designated by reference number 15. The cutting machine 15 essentially includes a holding frame 16 having a pair of rigid lateral members 16a, 16b and a shield plate 17 which extends therebetween at the implement-proximate side. At its lower end, the holding frame 16 is equipped with a transverse front cutting blade 18 extending between the lateral members 16a, 16b, and adjacent side cutting blades 19 as best seen in FIG. 1a. The cutting edges of the front blade 18 and the side blades 19 may be of smooth or profiled configuration and can be secured directly, or via attachable rails, to the frame 16. The cutting machine 15 is rotatable about attack points 8 by hydraulic cylinders 9 which have one end secured to the rocker 10 and another end secured to the frame 16 at attack points 7.

Figure 2:
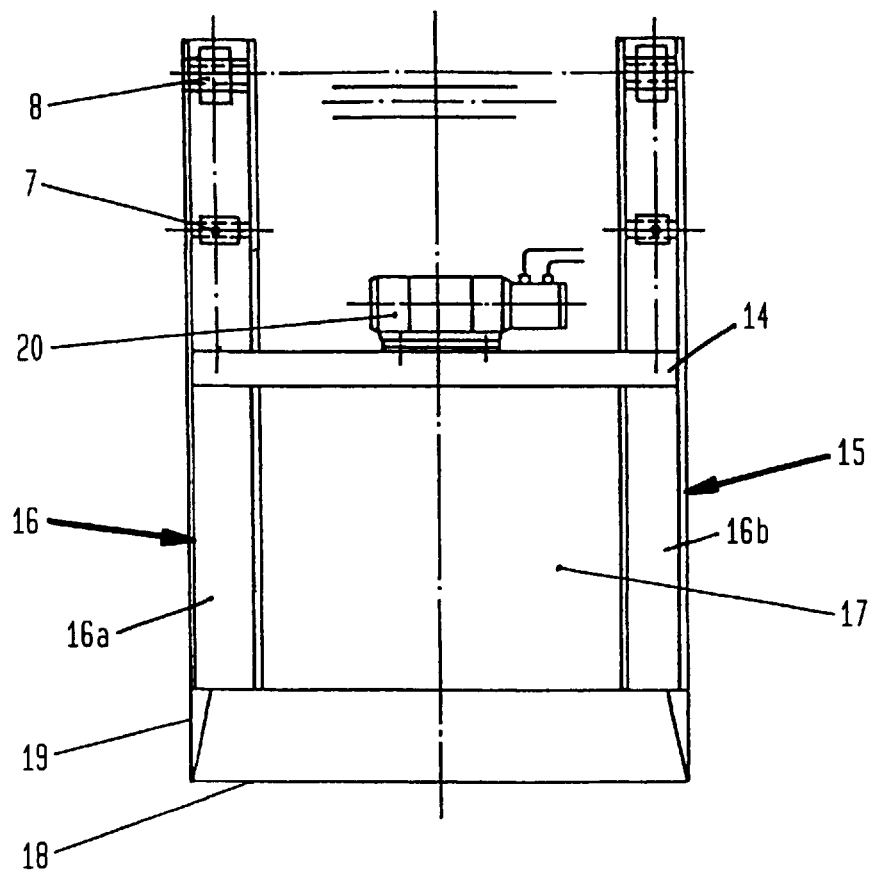
FIG. 2 is a rear view of the cutting machine of FIG. 1.
Figure 3:
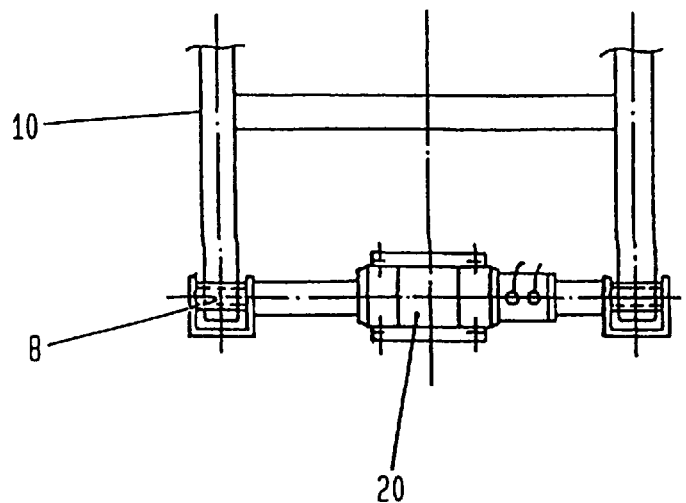
FIG. 3 is a top plan view of the cutting machine of FIG. 1.

As shown in particular in FIGS. 2 and 3, the frame 16 is further provided at a distance to the front blade 18 with a crossbar 14 that extends between the lateral members 16a, 16b and supports a vibrator 20 for generating oscillations of the frame 16. As shown in FIG. 1a, the crossbar 14 may be of any suitable rigid cross section, e.g. in form of a tube or rectangular bar. The vibrator 20 may be directly driven by a hydraulic motor, or by a mechanical drive, or may be operated electrically.

The rocker 10 is swingably mounted to the support column 13 about pivot point 11 by means of a hydraulic cylinder 12. When upwardly moving the rocker 10, the frame 16 together with the front blade 18, which is rigidly secured to the bottom of the lateral members 16a, 16b, is elevated to a level above the vertical dimension of the flat silo 2 and up to a cutting width in correspondence to a maximum length of the side blades 19, as indicated in dashdot lines.

While the vibrator 20 is activated, the hydraulic cylinder 12 executes a retractive stroke to lower the cutting machine 15 into the silo 2, whereby the high frequency of the front blade 18 and the side blades 19 cuts silage in a very precise and clean manner at a relatively high lowering speed.

In order to have the generated oscillations restricted only onto the cutting machine, the provision of damping elements such as rubbers, rubber buffers or rubber sleeves, preferably of caoutchouc or in form of rubber-metal elements, is preferred in the area between the cutting machine and the implement in the area of attachment of the rocker arm 10, preferably in the area of the attack points 8 and of the attack point 7 of the hydraulic cylinders 9 FIG. 1a illustrates a typical configuration of the attack points 7 and 8 for attachment of the hydraulic cylinders 9 and rocker 10, respectively. According to a typical design, the attack point 8 is formed e.g. by an outer metal sleeve 80 which is placed on a metallic hollow axle 81 and surrounds the damping element 82 that is connected to the sleeve 80 and the axle 81 e.g. through vulcanization. A screw fastener 83 is placed through the hollow axle 81 for securement of the overall damping structure with respect to the frame 16. The attack point 7 is formed in a similar manner by an outer metallic sleeve 70 which surrounds a vulcanized damping element 72 of caoutchouc or rubber and placed upon a hollow axle 71. A screw fastener 73 is placed through the hollow axle 71 for securement of the overall damping structure with respect to the frame 16.

The vibrator 20 is constructed such that the oscillating direction can be determined through opposite excitation of the forces of gravity. Preferably, the vibrator 20 generates oscillations in direction of the front cutting blade 18. An example of a typical vibrator 20 is shown in FIG. 1a and includes an unbalance shaft 202. Persons skilled in the art will understand that the number of employed vibrators is not limited to one but can be increased to best suit given conditions. The oscillations thus may be effected by several vibrators which can rotate in a same direction or in opposite directions, whereby the vibrators can be arranged in a linear relationship or offset to each other at an angle.

As shown in FIGS. 1 and 1a, the frame 16 forms with the crossbar 14 and the shield plate 17 a rigid construction which is oscillated as soon as the vibrator 20 is started to operate, with the configuration of the attack points 7 and 8 in the form of damping elements substantially preventing a transfer of vibrations onto the rocker 10 and hydraulic cylinders 9.

Preferably, the damping elements are made of rubber-metal compositions. If necessary, they may also be formed by steel springs or pressure reservoirs.

The cutting machine 15 according to the embodiment of FIGS. 1–3 is constructed in form of a cutter blade shield which is swingably mounted to the rocker 10. However, the cutting machine 15 may also be constructed in form of a U-shaped, vertically adjustable cutting frame.

Figure 4:
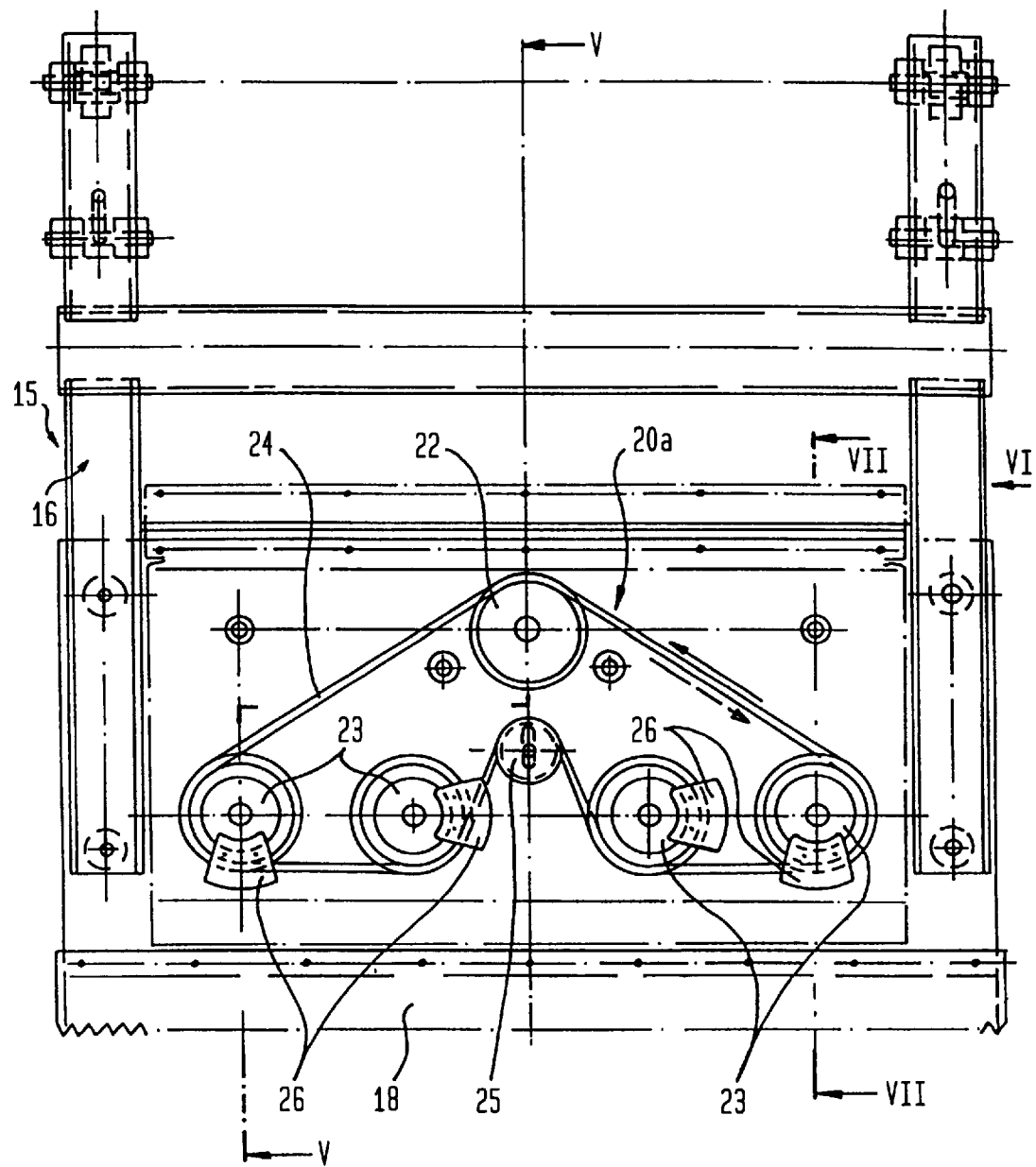
FIG. 4 is a rear view of another embodiment of a cutting machine according to the present invention for extraction of silage from a silo.

Turning now to FIG. 4, there is shown a further embodiment of a cutting machine 15 according to the present invention which differs from the embodiment of FIGS. 1–3 essentially in the configuration of the vibrator. FIG. 4 shows the cutting machine 15 with a vibrator 20a which is comprised of an output disk 22 driven by a motor 21, and several unbalanced flywheels 23 which are rotated by the motor-driven output disk 22 via a drive belt 24. In the nonlimiting example of FIG. 4, the vibrator 20a is provided with four unbalanced flywheels 23 which are lined on a plane that is in parallel relationship to the transverse front blade 18. The four unbalanced flywheels 23 form two respective pairs of unbalanced flywheels 23 which are driven in a same direction, with the reversal of the direction of rotation of both pairs being effected by a deflection pulley 25 via the belt 24.

Each unbalanced flywheel 23 carries a weight 26 in order to generate the desired unbalance. The arrangement of the weights 26 is such that the weights 26 of the outer unbalanced flywheels 23 are oriented parallel to one another while the weights 26 of both inner unbalanced flywheels 23 are arranged in same direction but offset by 90° in relation to the weights 26 of the outer unbalanced flywheels 23. A selective positioning of the weights 26 on the unbalanced flywheels 23 enables the operator to best suit the oscillation frequency upon the cutting machine 15 as driven by the vibrator 20a.

Figure 5:
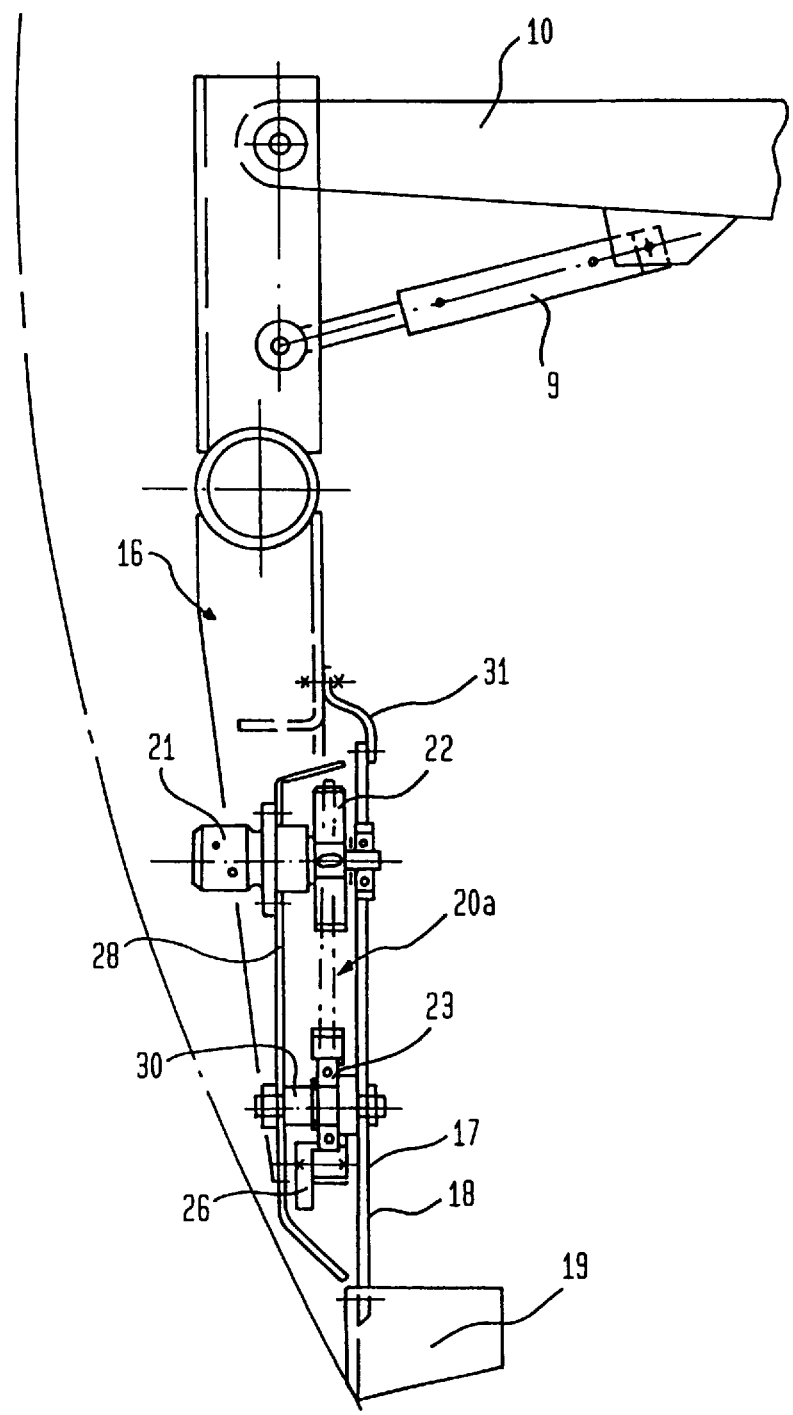
FIG. 5 is a schematic, sectional view of the cutting machine taken along the line V—V in FIG. 4.
Figure 6:
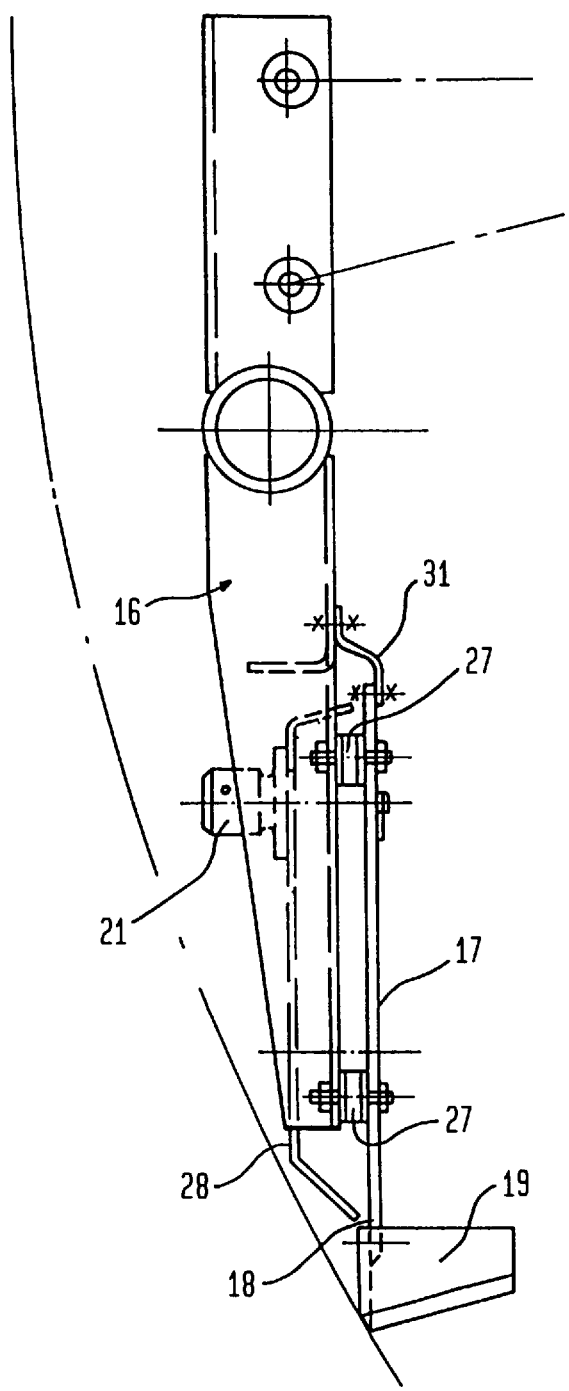
FIG. 6 is a schematic, sectional view of the cutting machine in direction of arrow VI in FIG. 4.

As shown in FIGS. 5 and 6, the entire vibrator 20a is mounted onto the shield plate 17 which is secured to the shield frame 16 via damping assembly in the form of swing elements 27 so that oscillations generated by the vibrator 20a are, to a large extent, prevented from being transmitted to the shield frame 16. The unbalanced flywheels 23 as well as the output disk 22 and the motor 21 are supported by pins 30 which are mounted between the shield plate 17 and an auxiliary plate 28. As clearly shown in FIG. 5, the auxiliary plate 28 covers also the entire vibrator 20a which is thus protected from the outside. As shown in particular in FIG. 7, the shield plate 17 is mounted to the auxiliary plate 28 at a desired distance from one another by spacers 29 which are suitably screwed on.

The gap formed between the shield plate 17 and the shield frame 16, as shown in FIGS. 5–7, is bridged by a covering 31 made of rubber or other suitable material so as to prevent penetration of dirt into the area of the vibrator 20a.

As best shown in FIG. 5, the axes of the unbalanced flywheels 23 and the axis of the drive wheel 22 extend perpendicularly to the shield plate 17 so as to effect an overall space-saving construction of the vibrator 20a upon the shield plate 17.

FIG. 8 shows a modification of the cutting machine according to FIGS. 4–7, with the difference residing in the disposition of the cutter assembly. As shown in FIG. 8, the front blade 18 as well as the side blades 19 are angled backwards relative to the shield plate 17 for effecting an improved cutting angle.

Turning now to FIGS. 9–12, there are shown schematic illustrations of exemplified configurations of the vibrator 20a.

Figure 9:
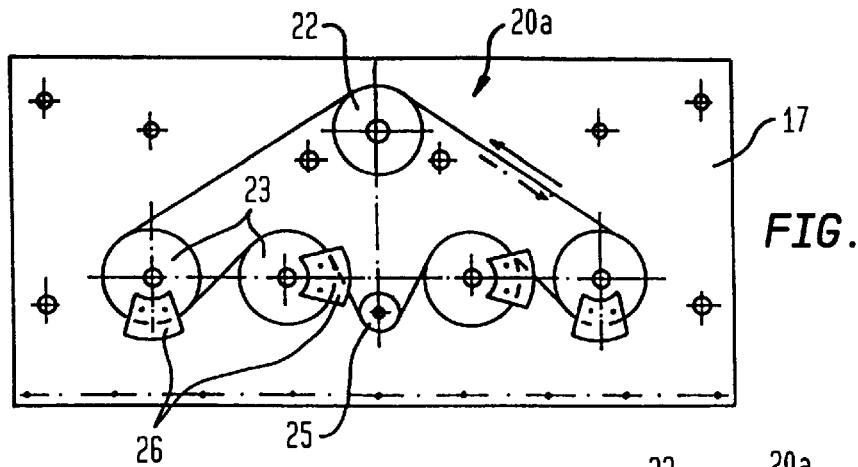
FIGS. 9–12 show schematic illustrations of various designs of vibrators for oscillating a silage cutting machine according to the present invention.

The configuration of the vibrator 20a, as shown in FIG. 9, corresponds essentially to the configuration of the vibrator 20a according to FIGS. 4–7, with the difference residing only in the positioning of the deflection pulley 25 which, in FIG. 9, is disposed underneath the plane of the unbalanced flywheels 25, and in the path of the belt 24 which extends in alternating directions from unbalanced flywheel 23 to unbalanced flywheel 23 so that the direction of rotation of two neighboring unbalanced flywheels 23 is reversed.

Figure 10:
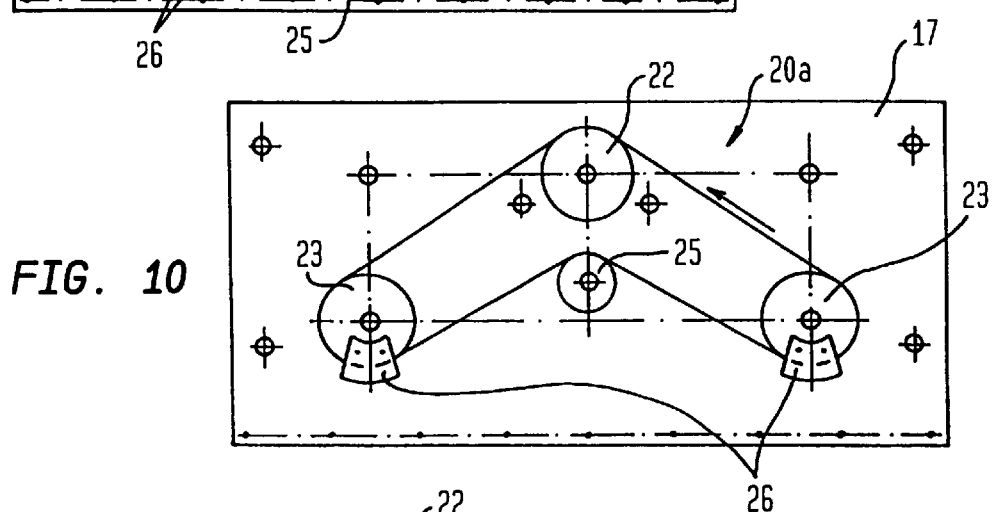

The vibrator 20a according to FIG. 10 includes only two unbalanced flywheels 23 disposed at equal distance from the output disk 22, whereby the two unbalanced flywheels 23 rotate in opposite directions through interposition of the deflection pulley 25. The weights 26 on both unbalanced flywheel 23 are arranged parallel to each other.

Figure 11:
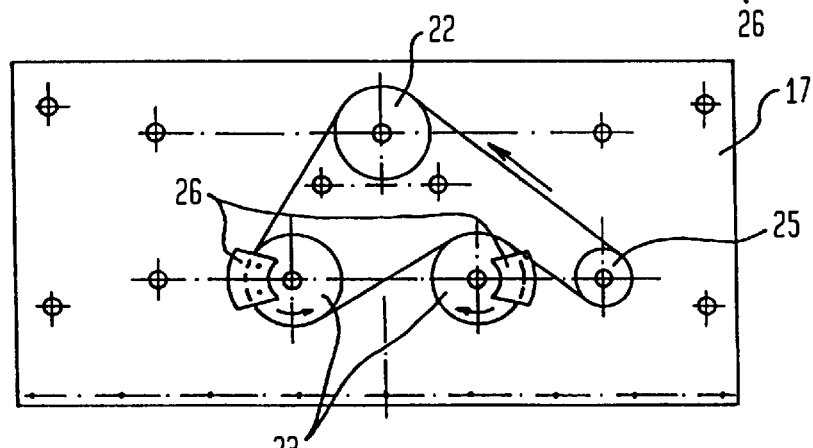

The vibrator 20a according to FIG. 11 has also only two unbalanced flywheels 23, with their direction of rotation being opposite to each other and with the deflection pulley 25 being disposed outside of both unbalanced flywheel 23.

Figure 12:
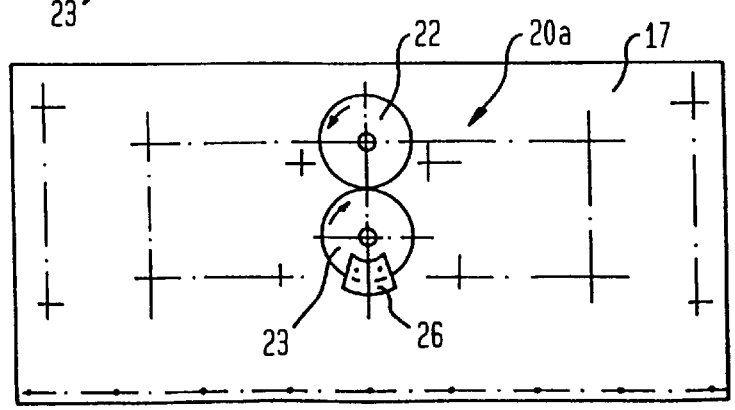

The vibrator 20a according to FIG. 12 is of comparably simple construction and includes only one unbalanced flywheel 23 with weight 26, which is acted upon directly by the output disk 22.

Persons skilled in the art will understand that the illustrations according to FIGS. 9–12 are only examples of a possible wide range of various constructions of the vibrator 20a for oscillating the shield plate 17 and thus the blades 18, 19 which are secured to shield plate 17.

FIGS. 13–15 show by way of example schematic illustrations of modified attachments between the rocker 10 and hydraulic cylinders 9, on the one hand, and the holding frame 16, on the other hand, at attack points 8 and 7, respectively. As shown in FIG. 14, the attack point 7 is formed by a damping assembly including a damping element 720 of caoutchouc or rubber which is vulcanized onto outer metal plates 730. The forward end of the piston rod 90 of the hydraulic cylinder 9 is secured by a threaded bolt 740 via a nut 750 to one of the metal plates 730 while the respective lateral member 16a or 16b of the frame 16 is secured by another threaded bolt 740 via a nut 750 to the other one of the metal plates 730. Constructed in a similar manner is attack point 8, which as shown in FIG. 15, is formed by a damping assembly including a damping element 820 of caoutchouc or rubber which is vulcanized onto outer metal plates 830. The forward end of the rocker 10 is secured by a threaded bolt 840 via a nut 850 to one of the metal plates 830 while the respective lateral member 16a or 16b of the frame 16 is secured by another threaded bolt 840 via a nut 850 to the other one of the metal plates 830. Thus, by way of this construction, the attack points 7 and 8 are so designed as to restrict vibrations transmitted by the vibrator 20 only to the frame 16 and keep them away from the hydraulic cylinders 9 and rocker 10.

While the invention has been illustrated and described as embodied in a cutting machine for extraction of silage from flat silos, it is not intended to be limited to the details shown since various modifications and structural changes may be made without departing in any way from the spirit of the present invention.

What is claimed as new and desired to be protected by Letters Patent is set forth in the appended claims:

1. A cutting machine for attachment to an implement for extraction of silage from flat silos, comprising:
    a frame having an underside and so secured to an implement as to be swingably movable upwardly and downward, said frame being formed with elastic attack points for attachment to the implement;
    a cutter assembly positioned at the underside of the frame; and
    at least one vibrator for oscillating the cutter assembly for enhancing a cutting action thereof.

2. The cutting machine of claim 1 wherein the underside is of straight, L-shaped or U-shaped configuration.

3. The cutting machine of claim 1 wherein the cutter assembly includes a front blade, said vibrator generating oscillations in direction of the front blade.

4. The cutting machine of claim 1, and further comprising a motor operated by fluid under pressure, said vibrator being directly driven by the motor.

5. The cutting machine of claim 1, and further comprising mechanical drive means for operating the vibrator.

6. The cutting machine of claim 1 wherein the elastic attack points are formed by buffers or sleeves made of a material selected from the group consisting of rubber and caoutchouc.

7. The cutting machine of claim 1 wherein the elastic attack points are formed by a rubber-metal composition.

8. The cutting machine of claim 1 wherein the vibrator is electrically operated.

9. The cutting machine of claim 1 wherein the cutter assembly is secured directly to the frame, said vibrator being placed directly onto the frame.

10. A cutting machine for attachment to an implement for extraction of silage from flat silos, comprising:
    a frame having an underside and so secured to an implement as to be swingably movable upwardly and downwardly;
    a cutter assembly positioned at the underside of the frame; and
    a plurality of vibrators for oscillating the cutter assembly for enhancing a cutting action thereof, each said vibrator including an unbalance flywheel for producing oscillations, said unbalance flywheels rotating in a same direction.

11. The cutting machine of claim 10 wherein the unbalance flywheels of the vibrators are positioned relative to each other at an angle.

12. A cutting machine for attachment to an implement for extraction of silage from flat silos, comprising:
    a frame having an underside and so secured to an implement as to be swingably movable upwardly and downwardly;
    a cutter assembly positioned at the underside of the frame; and a plurality of vibrators for oscillating the cutter assembly for enhancing a cutting action thereof, each said vibrator including an unbalance flywheel for producing oscillations, said unbalance flywheels rotating in opposite directions.

13. The cutting machine of claim 12 wherein the unbalance flywheels of the vibrators are positioned relative to each other at an angle.

14. A cutting machine for attachment to an implement for extraction of silage from flat silos, comprising:

a frame having an underside and so secured to an implement as to be swingably movable upwardly and downward;

a cutter assembly positioned at the underside of the frame; and at least one vibrator for oscillating the cutter assembly for enhancing a cutting action thereof, said vibrator including an output disk and at least one unbalanced flywheel driven by the output disk and including a weight for generating the unbalance.

15. The cutting machine of claim 14 wherein the vibrator includes a plurality of such unbalanced flywheels and a belt via which the unbalanced flywheels are commonly driven by the output disk.

16. The cutting machine of claim 15 wherein the unbalanced flywheels rotate in a same direction.

17. The cutting machine of claim 15 wherein the unbalanced flywheels rotate in different direction through incorporation of one or more deflection pulleys.

18. The cutting machine of claim 15 wherein the unbalance-generating weights of the unbalance flywheels are aligned in a same direction.

19. The cutting machine of claim 15 wherein the unbalance-generating weights of the unbalanced flywheels are aligned in a different direction.

20. The cutting machine of claim 14 wherein the frame includes a shield plate and an auxiliary plate extending parallel to and secured to the shield plate, said output disk and said unbalanced flywheel being supported by the shield plate and by the auxiliary plate.

21. A cutting machine for attachment to an implement for extraction of silage from flat silos, comprising:

a frame having an underside and so secured to an implement as to be swingably movable upwardly and downward;

a cutter assembly;

a shield plate for supporting the cutter assembly;

at least one vibrator attached to the shield plate for oscillating the cutter assembly for enhancing a cutting action thereof; and a damping assembly so interposed between the shield plate and the frame as to prevent oscillations from being transmitted to the frame.

* * * * *